United States Patent [19]
Littwin

[11] 3,938,011
[45] Feb. 10, 1976

[54] TAPE DEGAUSSER

[76] Inventor: Arthur K. Littwin, 2235 N. Knox Ave., Chicago, Ill. 60639

[22] Filed: Aug. 20, 1973

[21] Appl. No.: 389,578

[52] U.S. Cl. ..................................... 317/157.5 MR
[51] Int. Cl.² .......................................... H01F 13/00
[58] Field of Search .......... 317/157.5 R, 157.5 MR; 179/100.2 D; 360/66

[56] References Cited
UNITED STATES PATENTS

| | | | |
|---|---|---|---|
| 2,975,239 | 3/1961 | Jackson et al. | 317/157.5 |
| 3,506,884 | 4/1970 | McKinley | 317/157.5 |
| 3,619,729 | 11/1971 | Littwin | 317/157.5 |
| R25,607 | 6/1964 | Littwin | 317/157.5 |

Primary Examiner—J. D. Miller
Assistant Examiner—Harry E. Moose, Jr.
Attorney, Agent, or Firm—Paul H. Gallagher

[57] ABSTRACT

Apparatus for degaussing previously recorded tape, in reel form, in correspondingly bulk form, either of audio or visual character. It includes a conveyor for carrying the reel through the apparatus, past a pair of degaussing units which are magnetized for the degaussing steps, the degaussing units being arranged at mutually angular positions, and both at an angle to the direction of the passage of the reel through the apparatus. Means is included for reversing the polarity of the magnetism of the units repeatedly in progressively diminishing values for effecting the degaussing operation. The apparatus includes means for varying the speed of the conveyor to vary the period in which the tape is subjected to the degaussing operation. The apparatus will accommodate tape reels of great depth, either singly or in a stack, i.e., in axial direction of the reel, of more than two inches.

4 Claims, 5 Drawing Figures

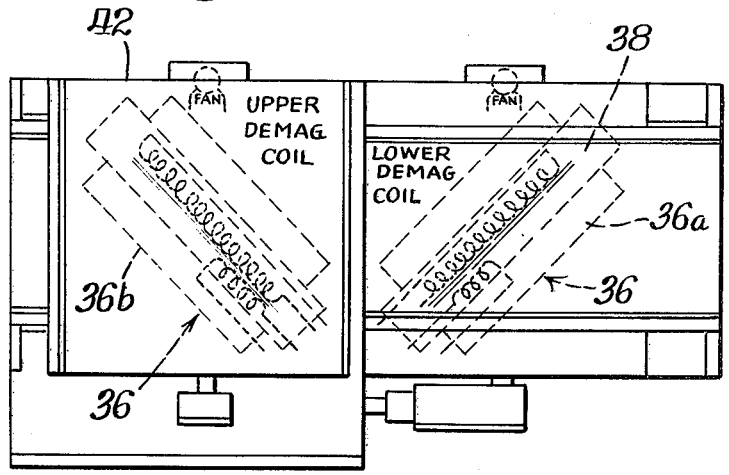
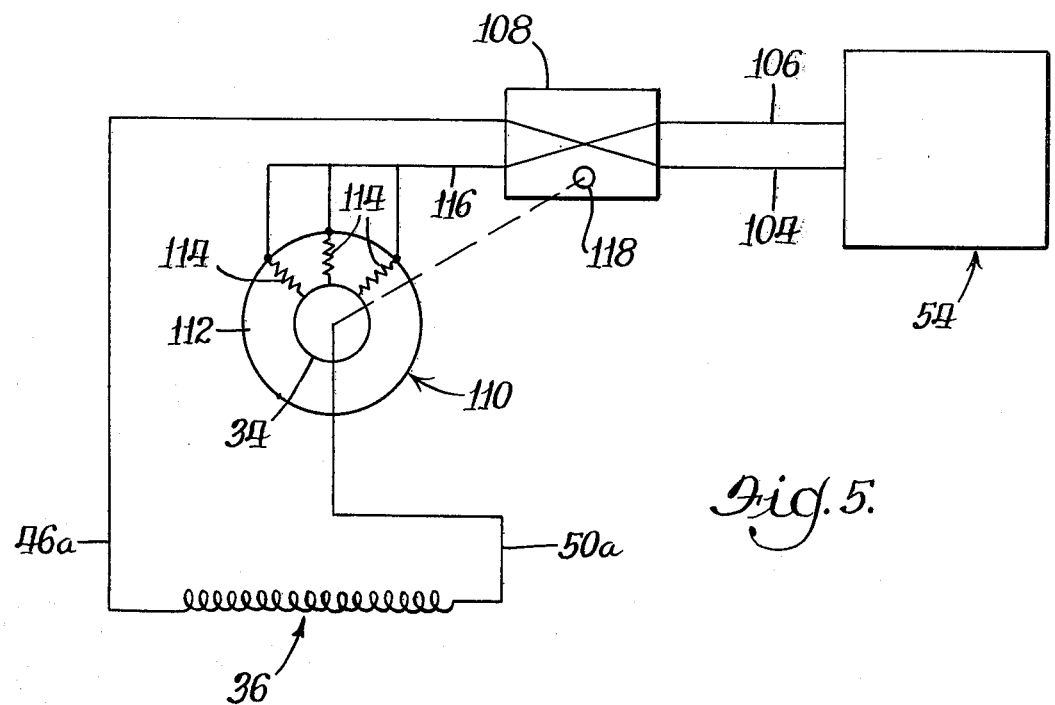

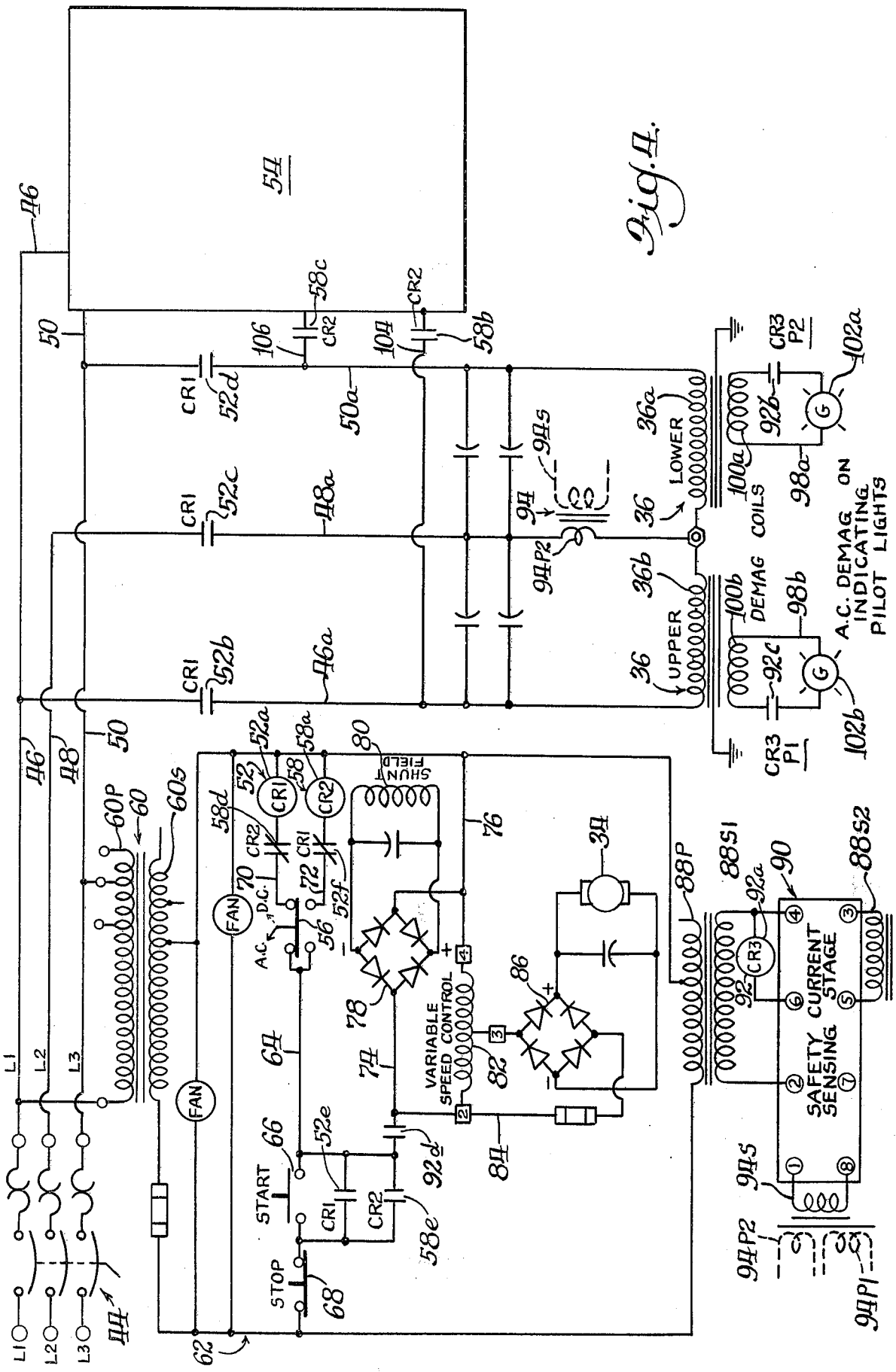

TAPE DEGAUSSER

BACKGROUND OF THE INVENTION

The invention relates to degaussing or demangetizing recording tapes which have been magnetized or recorded on, linearly along the tape; the tape is normally kept in reel form or coiled form, both before and after the recording, and it is desired to degauss or demagnetize the reel as a whole, or in bulk form and not linearly of the tape. Bulk demagnetizing as a general operation has been done before, but the present invention relates to specific apparatus and method for accomplishing that overall effect.

OBJECTS OF THE INVENTION

A broad object of the invention is to provide novel apparatus for and method of degaussing or demagnetizing a magnetic tape in reel form or bulk form.

Another object is to provide such apparatus and method capable of degaussing a great mass of tape in bulk form, such as a plurality of reels in axially stacked form, resulting in a bulk of substantial dimension in axial direction, as well as of great dimension in diametrical direction.

A further object is to provide in a single apparatus, a novel arrangement for selectively demagnetizing the tape by either AC or DC and for doing so in a simple manner as by merely flipping a switch.

Yet another object is to provide apparatus of the general character referred to wherein novel means is provided for varying the speed of the tape through the degaussing field, and for varying the length of reversals of the effective degaussing steps, whereby to vary the speed of degaussing of the tape practically in infinite variations.

A further object is to provide apparatus for and method of the foregoing character for degaussing tape in bulk form, having a novel arrangement for applying magnetic degaussing fields successively in different angular positions, whereby to eliminate incidental noises that might otherwise occur in the tape at diametrically opposite sides of the tape as occasioned by opposite ends of the degaussing means as related to the diameter of the reel containing the tape.

Other objects are to provide novel apparatus and method, effective in the operation thereof, to utilize the strength of the degaussing operation to indicate whether the intended full degaussing strength is effective; to utilize the strength for controlling the conveyance of the tapes through the apparatus; to control the operation according to the value of the operating voltage applied from the source; and for other purposes.

DESCRIPTION OF A PREFERRED EMBODIMENT

In the drawings

FIG. 3 is a top view of the apparatus;

FIG. 4 is a diagram of the main electrical circuit utilized in the apparatus; and FIG. 5 is a diagram of a component of the main circuit of FIG. 4.

Figure 1:
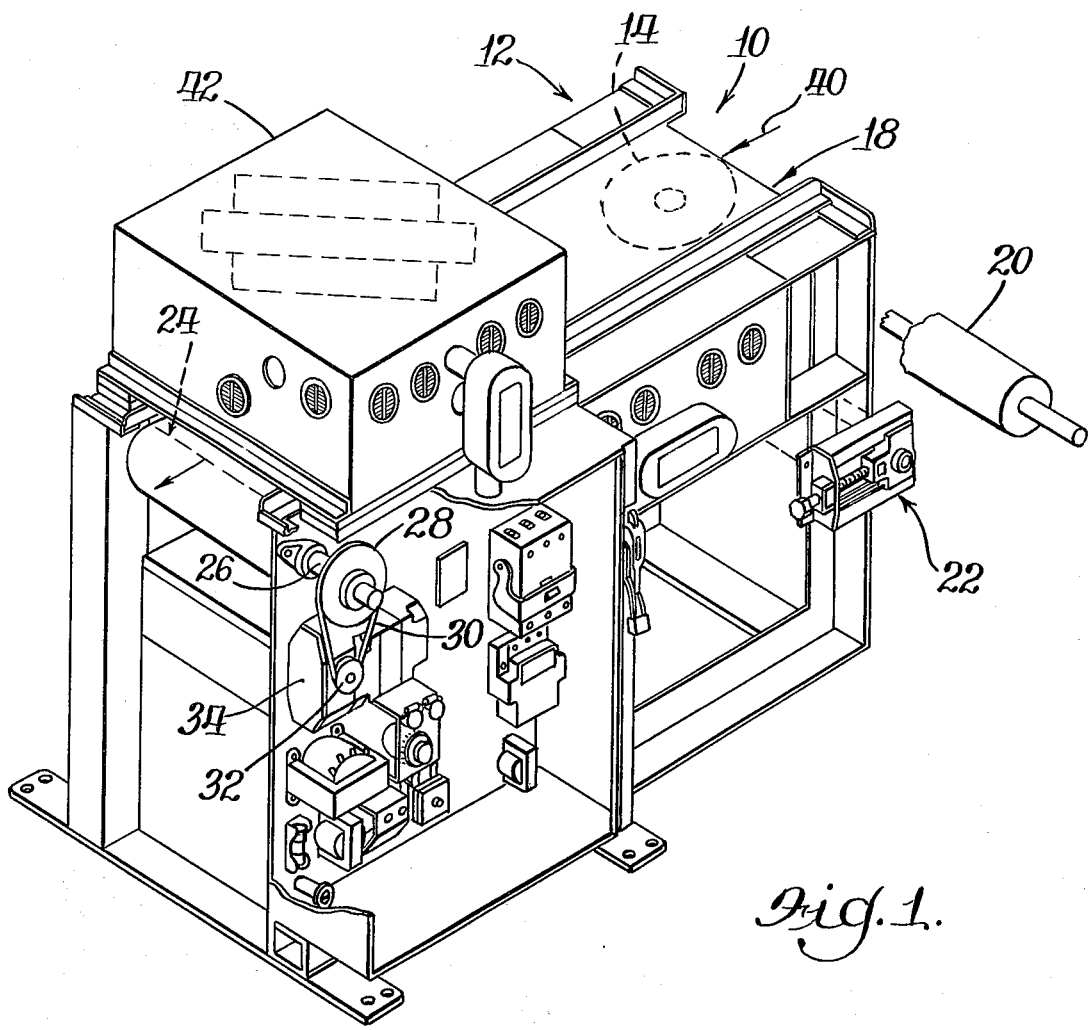
FIG. 1 is a perspective view of the apparatus of the invention with certain portions broken away.

Referring in detail to the drawings, attention is directed first to FIG. 1, which shows the apparatus as a whole, designated 10, which includes a suitable framework for mounting the various mechanical parts and electrical components. The framework may be of any suitable character and need not be described in detail except as it relates to certain significant and important elements of the invention as referred to hereinbelow.

Figure 2:
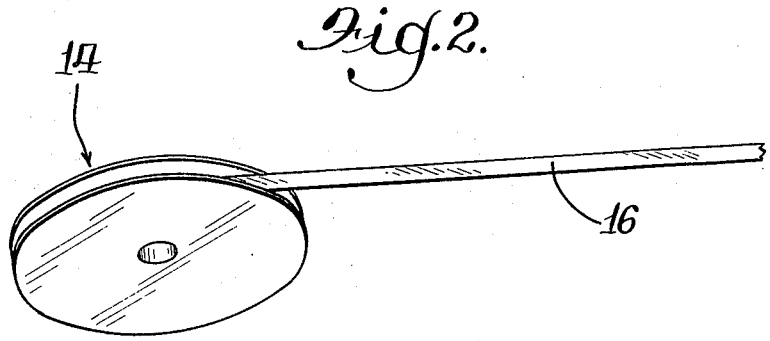
FIG. 2 is a perspective view of a reel of tape for which the apparatus is particularly adapted for degaussing.

FIG. 2 shows a reel 14 on which a magnetic tape 16 is reeled or coiled, this reel and tape being of known kind.

The apparatus 10 includes an endless conveyor belt 18 on which the reel 14 is placed for carrying it through the apparatus in a predetermined path. The conveyor 18 at its non-driving end is trained on a roller 20, shown in FIG. 1 in exploded position, and a suitable belt tightening device 22 also shown in FIG. 1 in exploded position, works on the roller 20 for varying the tension on the conveyor 18.

The conveyor 18 at its driving end is trained on a roller 24 preferably is fixed location, this roller 24 having a shaft 26 on which is a pulley 28 driven through a belt 30 from a drive pulley 32 on a variable speed motor 34. The motor 34 as well as other electrical components is shown also in the electrical circuit of FIG. 4. This motor may be of any suitable and known type, but variable in speed, preferably through a great range so as to drive the conveyor 18 at any suitable speed in virtually infinitesimal increments, such as, for example from 0 per minute to 40 per minute. Also shown in FIG. 1 are various ones of the electrical components which are also included in the electrical circuit of FIG. 4.

Shown in FIGS. 1 and 3 are degaussing units 36 individually identified as 36a and 36b. The degaussing units 36 in the form of electromagnets, have polar ends identified 38 establishing degaussing fields in corresponding directions, described in detail and for purposes referred to hereinbelow.

The degaussing units 36 are spaced longitudinally along the belt, the belt running for example in the direction of the arrows 40. These degaussing units further are disposed at different elevations so as to be respectively below and above the tape reel as the latter is carried along the conveyor. Additionally, the degaussing units are disposed at a mutual angle, preferably of 90°, and each is disposed at a corresponding angle, or 45°, to the direction of the movement of the conveying belt. As noted particularly in FIG. 3, the degaussing units extend fully across the width of the conveyor so as to impress the degaussing field fully on the reel or reels that are carried through.

Preferably the first degaussing unit 36a is disposed under the upper run of the conveyor, the conveyor material being of suitable kind as not to interfere with the impression of the field on the reels. The second degaussing unit 36b is mounted in a suitable frame element 42 in the framework and is disposed at a suitable level above the reels placed on the conveyor. Both units are disposed at suitable distances respectively below and above the top run of the belt so as to fully impress the degaussing field on the reels.

In the degaussing operation, the reels 14 are placed on the conveyor as indicated in FIG. 1. This may be a single reel or a stack of such reels arranged on a common axis. The apparatus as constructed in one form and capacity will handle reels in a stack to the extent of 2 inch thick in axial direction. The conveyor may be of any suitable width, such as 15 inch, so as to accommodate reels of large size, and it may be 4 feet long. These dimensions are only examples.

The conveyor carries the reels along, first over the first degaussing unit 36a and then under the second degaussing unit 36b. The speed of the belt is predetermined according to the mass or other characteristics of the reels at a suitable speed within the range indicated above. The diagonal arrangement of the degaussing units assures that all portions of the coiled tape are equally treated thereby so as to avoid any possible gaps in degaussing effect at diametrically opposite points on the reels.

Reference is next made to FIg. 4 showing the main electrical circuit utilized in the apparatus. In this circuit the coils and contacts of the respective relays are given the same reference numerals, the former with the subscript a and the latter with successive subscripts b, c, etc. Similarly, transformers are identified with single reference numerals, the primaries having the subscript P and the secondaries with the subscript S with additional numbers in the case where there are more than one secondary.

A suitable AC source 44 is provided, preferably three phase, with lines 46, 48, 50, connected to lines 46a, 48a, 50a leading directly to respective ones of the degaussing units 36, these lines providing AC to the degaussing units. DC is provided by a DC unit 54, both as explained further hereinbelow. The degaussing units 36 are also known in the trade as "DEMAG" coils as indicated in FIG. 4.

The application of AC or DC to the degaussing unit is controlled by an AC-DC switch 56 and in the position of that switch shown, it applies AC to the degaussing units, energizing the relay 52, while in the opposite position it applies DC to the degaussing units through a relay 58, and as referred to hereinbelow.

Connected with AC source 44 is a transformer 60, the secondary of which is connected to a sub-circuit 62. Across the sub-circuit is a line 64 in which is a START switch 66 and a STOP switch 68. This line also includes the AC-DC switch 56 and leading from this line are branch lines, an AC line 70 and a DC line 72, respectively including the relays 52, 58. The sub-circuit also includes lines 74, 76 leading to a rectifier 78 for applying DC to the shunt field 80 of the motor 34 identified above, the latter also being included in the sub-circuit 62. The line 76 also leads to a variable speed control unit, the latter being connected to a line 84. The variable speed control unit 82 acts through a rectifier 86 for controlling the speed of the motor 34.

Also included in the sub-circuit 62 is a transformer 88, the secondary of which leads to a safety current sensing stage 90. This last unit includes a relay 92, and so long as the main power source is connected, the transformer 88 is energized and the secondary thereof controls the safety current sensing stage unit 90. The latter unit includes a control transformer 94. So long as the transformer 88 is energized the relay 92 is energized, performing certain operations. Relay contacts 92b, 92c are included in circuit units 98a, 98b including pick-up coils 100a, 100b respectively operatively associated with the degaussing units 36a, 36b, and when energized turning on signal lights 102a, 102b. So long as the main power source is on and the transformer 88 is energized, the relay 92 closes the contacts 92b, 92c and turns on the signal lights 102. Additionally, when the relay 92 becomes de-energized, such as failure of the power source, the contacts 92d are opened, opening the circuit to the shunt field of the drive motor.

To initiate operation of the AC phase of the apparatus, the START switch 66 is closed, and with the switch 56 in AC position, the relay 52 closes the contacts 52e and sets up a holding circuit through the line 64. The relay 52 also opens the contacts 52f opening the circuit to the DC relay 58.

To initiate the DC phase, the switch 56 is moved to DC position and the START switch 66 closed. This energizes the relay 58 which closes the contacts 58e setting up a holding circuit. Also the relay 58 opens the contacts 58d and opens the circuit to the AC relay 52.

The unit 54 may be similar to that of my prior U.S. Pat. No. 3,619,729, dated Nov. 9, 1971, for generating DC. This unit is fed by lines 46, 50, leading from the AC source, and includes output lines 104, 106 having the contacts 58b, 58c respectively and connected with the lines 46a, 50a.

Summarizing, when the relay 52 is energized the contacts 52 are closed and AC is applied to the degaussing unit, and the relay 58 is de-energized, and the contacts 58b, 58c are open. In the DC phase, the relay 58 is energized which closes contacts 58b, 58c and the relay 52 is de-energized, leaving the contacts 52 open and DC is applied from the unit 54 to the degaussing units.

FIG. 5 shows diagrammatically a means for reversing the polarity of the degaussing units at intervals proportionate to the speed of a conveyor. This FIG. shows the DC unit 54 and a conventional reversing switch 108. A resistance unit 110 includes a body 112 and a plurality of resistances 114 of values increasing in a preselected direction, as referred to below. The unit is controlled by or driven by the variable speed motor 34 which drives the conveyor. One of the lines from the degaussing units, e.g., 50a is connected to the unit at a common point, and the resistances 114 are connected to a line 116 leading to the reversing switch 108.

The unit is operative upon rotation by the motor for connecting the conductor 50a successively with the resistances. The reversing switch is controlled by an element 118 driven by the motor. As the motor operates, the DC applied to the degaussing units is reversed in polarity in steps successively, and upon each reversal, the voltage applied to the units is reduced because of the increase in value of the resistances referred to. This reversal of polarity and reduuction of voltage utilizes the principle of my prior U.S. Pat., Re. No. 25,607, dated June 30, 1964.

A great advantage of this arrangement is that the reversal of polarity and reduction of voltage are in direct proportion to the speed of the conveyor, so as to effect complete degaussing regardless of the speed of the conveyor.

The unit 110 and reversing switch 108 are indicated here strictly diagrammatically, and any desired form and arrangement may be used that perform the desired results, such as solid state reversing switch and control thereof.

It has been found that DC is effective for degaussing the tapes and is more economical than AC, utilizing much less power. On the other hand AC is much more effective in completely erasing all of the background noises in the tapes, than is DC, but more power is required and it is not so economical. In those cases where it is not necessary to eliminate all background noises, DC may be used, while on the other hand there may be many occasions when it is desired to erase all sound including background noises, and in that case, AC may be used. The arrangement of this apparatus provides an unusually effective and efficient arrangement for applying either AC or DC selectively, and further it includes a simple means for selecting the AC or DC, through the switch means 56.

The apparatus is equally effective for degaussing tapes of both audio and video character.

The apparatus can be effectively operated in the neighborhood of 3–4 KVA instead of the usual higher power required, such as in the neighborhood of 56 KVA.

The control unit 94 in the safety current sensing stage unit 90 includes a transformer primary 94P1 included in the DC unit 54 which operates through the secondary 94S to indicate an operating signal in the unit 90. The unit 94 additionally includes a coil 94P2 included in the line 48a between the degaussing units which also is effective for setting up a signal through the secondary 94S according to the application of AC on the degaussing unit.

Additionally, the secondary 88S2 is energized so long as the primary 88P is energized by continuation of the power source for further producing a signal in the unit 90.

I claim:

1. Apparatus for degaussing a magnetized tape wound in a reel about an axis and constituting bulk or mass form, comprising conveyor means for conveying the tape continuously in a path extending longitudinally through the apparatus, degaussing units in juxtaposition to the path and in close juxtaposition to the tape as the tape is conveyed along the path, the degaussing units being operative for impressing degaussing magnetic fields on the tape, and means for adjustably driving the conveyor means at progressively reduced speeds and correspondingly adjustably reducing the magnetic field of the degaussing means to a level approximating zero while the tape is in the range of and passing the degaussing units.

2. Apparatus according to claim 1 and including means for degaussing the tape in steps proportionate in number to the speed of the conveyor.

3. A method of degaussing a magnetized tape in reel form including the steps, conveying the tape reel along a path, proving a degaussing magnetic field and impressing it on the tape and reducing the degaussing magnetic field as the tape is moved therealong to a point where the magnetic field of the tape approaches zero, and including the additional step of varying the speed of conveyance of the reel and correspondingly varying the intensity of the degaussing magnetic field in relation to the speed of conveyance of the reel whereby to effectively reduce the magnetic field of the tape to zero regardless of the rate of conveyance of the reel.

4. A method according to claim 3 wherein the degaussing operation is conducted in steps in which the polarity of the magnetic field impressed on the reel is reversed in a series of steps, and the number of steps utilized in degaussing the magnetic field is varied in accordance with the rate of conveyance of the reel and the rate of reduction of the degaussing magnetic field in the degaussing unit.

* * * * *